Figure 1:
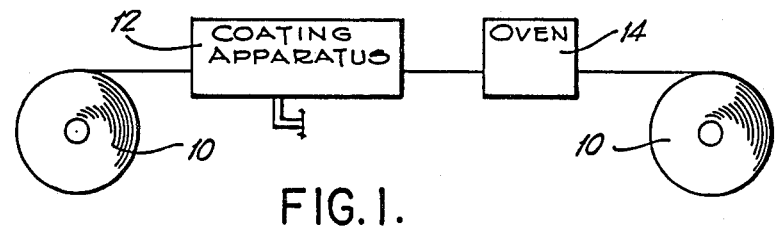

United States Patent [19]
Walling et al.

[11] 4,381,728
[45] May 3, 1983

[54] FLUIDIZABLE BED STRUCTURE

[75] Inventors: Jorg-Hein Walling, Beaconsfield; Gerald R. Arbuthnot, Chateauguary; Andre Dumoulin, Deux Montagnes, all of Canada

[73] Assignee: Northern Telecom Limited, Montreal, Canada

[21] Appl. No.: 312,651

[22] Filed: Oct. 19, 1981

[51] Int. Cl.$^3$ .................. B05C 3/15; B05D 1/22; B05D 7/20
[52] U.S. Cl. .................. 118/621; 118/DIG. 5; 427/25; 427/27; 427/32; 427/185
[58] Field of Search .............. 118/620, 621, DIG. 5; 427/13, 25, 27, 29, 185, 32

[56] References Cited

U.S. PATENT DOCUMENTS 3,670,699  6/1972  Sargent .................. 427/185
3,875,898  4/1975  Braden .................. 427/185

Primary Examiner—John H. Newsome
Attorney, Agent, or Firm—R. J. Austin

[57] ABSTRACT

A fluidizable bed structure with a rigid support for carrying a bed of fluidizable powder, the support being at least two inches deep and having its porosity formed by interstices which reduce in total area from the lower surface of the support to its upper or support surface. A fluidizable bed structure is also described having a support which has an electrode contacting it with the depth of the support from its upper surface to the electrode sufficient to prevent arcing from the electrode to the upper surface.

16 Claims, 5 Drawing Figures

FLUIDIZABLE BED STRUCTURE

This invention relates to a fluidizable bed structure.

The use of fluidizable bed structures is known in electrostatic coating apparatus for coating with polymeric materials, continuous lengths of material such as electrical conductors passed over the beds. In such constructions, the fluidizable bed structures comprise a housing carrying a porous support which carries a bed of fluidizable powder above it in a fluidization chamber. Beneath the support is located a plenum which is provided to accept incoming pressurized air and allow for distribution of the air within the plenum and beneath the plate, the air then passing through the plate and through the powder bed to fluidize it. The coating of the continuous article takes place by electrostatic attraction, the article being disposed over the fluidized bed and in general connected to a ground potential while the particles of powder are either positively or negatively charged. To charge the particles of polymeric powder, the air is itself charged and imparts this charge to the particles as it passes through the powder. In one known form of electrostatic coating apparatus, an electrode is disposed on top of the support and, as the air passes through it, the air becomes charged and relays the charge into the powder. This type of construction is accompanied by serious inherent disadvantages.

One of these disadvantages is that the fluidizable bed has depth which is excessive in order to prevent electric current from passing from the electrode directly to the work piece. Hence the total volume of fluidizing medium acquired to obtain a state of incipient fluidization is high. A further disadvantage stemming from this is that because of the excessive depth of the bed, there is a high pressure drop of the fluidizing air across the porous support and through the particulate material.

Further, because of the depth and quantity of powder, there is an increased risk that bubbles will form within the fluidized medium, that there will be channelling of air through the fluidizing medium, and that consequent elutriation will result, i.e. the upward separation of the smaller particles under the influence of the air stream. All these factors may result in an uneven level of the fluidized bed and hence in non-uniform coatings on the workpiece as the charged particles of material, being attracted from the bed onto the workpiece, tend to be more dense in some areas above the bed than in others. In addition, it is normally expected that with this type of apparatus, the more highly charged particles will be attracted to the workpiece to adhere to it. However, if particle elutriation does result, then lower charged particles could be raised to the top of the fluidized bed and brought into contact with the workpiece. Because these particles are not very highly charged, then the electrostatic force holding them to the workpiece may be too low to ensure that they remain on the workpiece surface before the workpiece passes through an oven to fuse the particles together in the form of a coat. Hence, with this type of arrangement of fluidized bed, there is an increased chance that the particulate material will drop from the surface of the workpiece before the heating operation takes place. As a result, the final fused coating may be of unsatisfactory condition and contain many pinholes or crater formations.

A porous support in a fluidized bed structure as described, is normally not of rigid character. Of course, a non-rigid structure tends to change shape slightly in use, thus leading to a non-uniform porosity across the support surface and hence a tendency to increase the formation of bubbles or channelling of the fluidizing medium. To decrease this tendency the support is vibrated in use. This results in increased noise levels within a factory area and also to a decrease in the working life of the support and other parts of the fluidizable bed structure. It would be an advantage, therefore, if vibration of the support could be avoided.

Other disadvantages of the above fluidizable bed structure are concerned with the safety aspect. It is not unknown for a break in an electrical conductor to occur downstream of the fluidized bed within an oven during fusing of the particulate material. In such situations, it is possible for there to be flame spread along the polymeric material covering the wire and upstream into the fluidized bed. Many types of materials which are used for electrostatic coating applications are of a highly flammable nature. These materials when in powder form such as in a fluidized bed, are extremely likely to burn or even to explode as the surface area of the particles is extremely large and is exposed to the fluidizing air. While an explosion in the bed is itself extremely dangerous, there is a danger that the explosive force could be increased. This is because the support of the fluidizable bed is likely to rupture under the force of the explosion, thus allowing the pressurized fluidizing medium in the plenum to burst through the support to augment the explosive force.

To overcome some of the problems associated with the above fluidized bed construction, Canadian Pat. Nos. 1,046,355 and 1,070,105 granted on Jan. 16, 1979 and Jan. 22, 1980 to Electrostatic Equipment Corporation, U.S.A. are concerned with the location of an ionizing means for ionizing the fluidizing medium in a position beneath the support. As disclosed in these patents, the ionizing means is located a sufficient distance away from the support to prevent the passage of a substantial current from the ionizing means to an oppositely charged member disposed in the fluidization chamber. In this structure, however, the plenum size beneath the porous support has to be increased substantially thus increasing, considerably, the volume of fluidizing medium which is under presure. In this type of structure, the supports tend to be of non-rigid nature, thus resulting in the disadvantages in the above referred to construction, i.e. non-uniform porosity and non-uniform distribution of the ionized or charged fluidizing medium. To reduce this, it is known to provide reinforcing members mounted inside the fluidization chamber, but these members cause a lengthening in the amount of time required for changing a bed of particulate material and also they increase the non-uniformity of pressurized air distribution and encourage the formation of air channels through the fluidized medium. In this type of structure, to avoid the non-uniformity of distribution, vibration of the support is again necessary. Further, with this type of construction as disclosed in the two Canadian patents referred to, while the electrode is situated so as to be protected from passage of a substantial current into the fluidization chamber, rupture of the support is indeed possible. Should a rupture occur, then with the plenum being greater in volume than in the earlier fluidizable bed structures referred to, there is the chance that any explosion in the fluidization chamber will be more violent. In addition, upon rupture of the support occurring, the barrier between the electrode and the workpiece is now removed and a spark or passage of current may be initiated thus causing ignition to the polymeric particulate material and a large explosion.

It would be to advantage if some means could be provided for reducing the chances of an explosion occurring should there be flame spread along the continuous article and into the fluidization chamber. It would also be advantageous to be able to provide a distribution of electrically charged air which is sufficiently uniform across the support to be acceptable without the use of a vibrator.

According to one aspect of the present invention, there is provided a fluidizable bed structure comprising a housing, a rigid porous support within the housing for carrying a bed of fluidizable powder and for supplying fluidizing gas through the support and into the powder, the support having a depth from a support surface of at least 2" and having its porosity formed by interstices passing through the support, the interstices reducing in total area from an input side of the support to the support surface.

With the above structure, while the depth of the support is substantial, gas pressure drop is reduced by the reduction in total area from the input side of the support to the support surface. In an ideal construction, the reduction in total area of the interstices takes place progressively from one side to the other of the support. However, in practice, this progressive reduction is difficult to accomodate. In a practical sense, therefore, it is possible to reduce the total area of the interstices in steps from one position through the support to another. This may be done effectively by building the support in layers of material, the material in each layer having different size characteristics from the material in adjacent layers. For instance, in a preferred support construction, the support is formed from glass beads, surfaces of which are fused together. The glass beads at the support surface are relatively small compared to the size of the beads at the input side or base of the support. This results in a reduction in the size of the interstices at the support surface as compared to their size at the base. In one suggested arrangement, the glass beads at the base are of ⅛" diameter (nominally) and at the support surface are between 15 and 90 microns in size, the bead size decreasing upwardly from the base towards the upper surface. As may be seen, the support is made by layering the different sized beads in position one layer above another and then fusing or otherwise adhering the glass beads together to form the finished structure.

In a further preferred arrangement, the glass beads are located in position within a cavity formed by sides and a base provided by sheets of material for containing and holding the beads in position. Of course, in such a structure, the base sheet must itself be porous and may form the upper surface of the support.

In such a fluidizable bed structure, sufficient strength may be provided in the support to prevent it from rupturing either by an explosion occurring in the fluidization chamber or by the pressure drop from the plenum and into the chamber. In either case, the fluidized gas in the plenum is prevented from rushing through the support and through the fluidization chamber whereby the chances of a major explosion occurring are reduced.

Also according to the invention, there is provided a fluidizable bed structure comprising:
a housing,
a rigid porous support within the housing for carrying a bed of fluidizable powder, and for supply of fluidizing gas through the support and into the powder, and
an electrode extending across the structure, contacting material of the support and allowing fluidized gas to pass through the support, the depth of the support from its upper support surface to the electrode being sufficient to prevent arcing from the electrode and through the support to its upper surface.

With the above structure, according to the invention, it is possible to provide a support which is of substantial depth from its upper surface to the electrode whereby substantial resistance is provided by the support to rupture. It is anticipated that the required depth from the surface to the support to prevent arcing is proportional to the applied voltage to the electrode. This depth may be of the order of 0.6"/10 Kv applied to the electrode. Hence, with the electrode designed to accomodate 80 Kv, then the depth from the surface to the electrode should be at least in the region of 4.8". It is believed that this depth is less than would be required through an open space. This is because the pores through the support are tortuous and are longer than a straight bore through any given support.

The electrode may be actually embedded in the support or may be disposed along its lower surface. In either case, it is preferable to provide a support which has its interstices decreasing in total cross-sectional area from the electrode upwards towards the upper surface. With this arrangement, the fluidizing medium becomes distributed through the support more uniformly than with previous constructions whereby a more uniform distribution through the fluidization chamber from the support surface is achievable. Hence, it is completely unnecessary with this structure to provide a vibrating means to enable uniform distribution of air to be obtained.

It is also preferable to extend the support below the electrode. Thus interstices in the support from a bottom surface extend upwardly to the electrode and assist in distributing the air, before charging, evenly across the electrode. Such a distribution of air during its passage through the electrode is not achievable in conventional apparatus.

The invention also includes a method of electrostatically coating an article with a fluidized bed of coating powder comprising:
electrostatically charging a fluidizing gas;
passing the gas upwardly through a support for the bed and through interstices of the bed which decrease in total cross-sectional area and increase in number upwardly through the bed to assist in distribution of the gas across the support; and
passing the gas outwardly from the support to fluidize the bed and electrostatically charge the powder to cause it to be attracted to the article which is at opposite potential.

Figure 5:
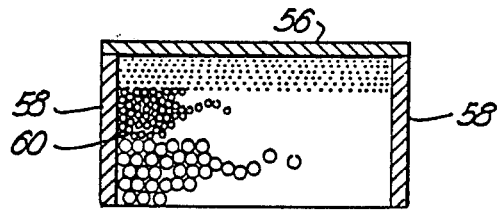
Figure 2:
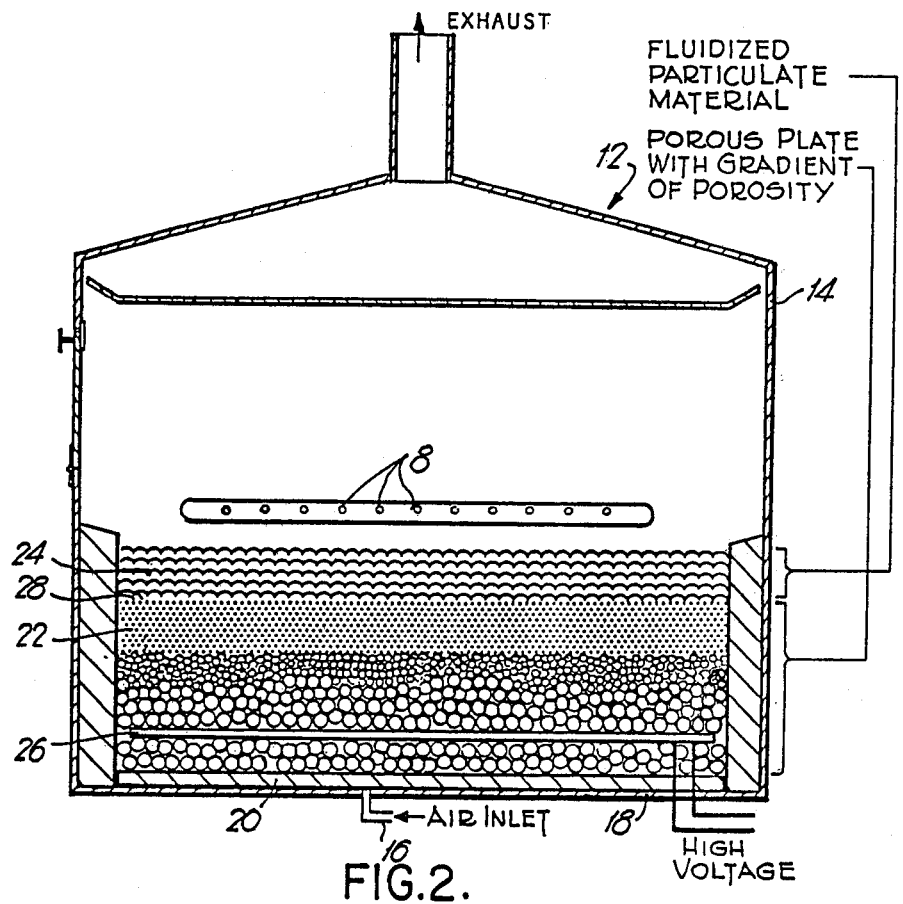
Figure 3:
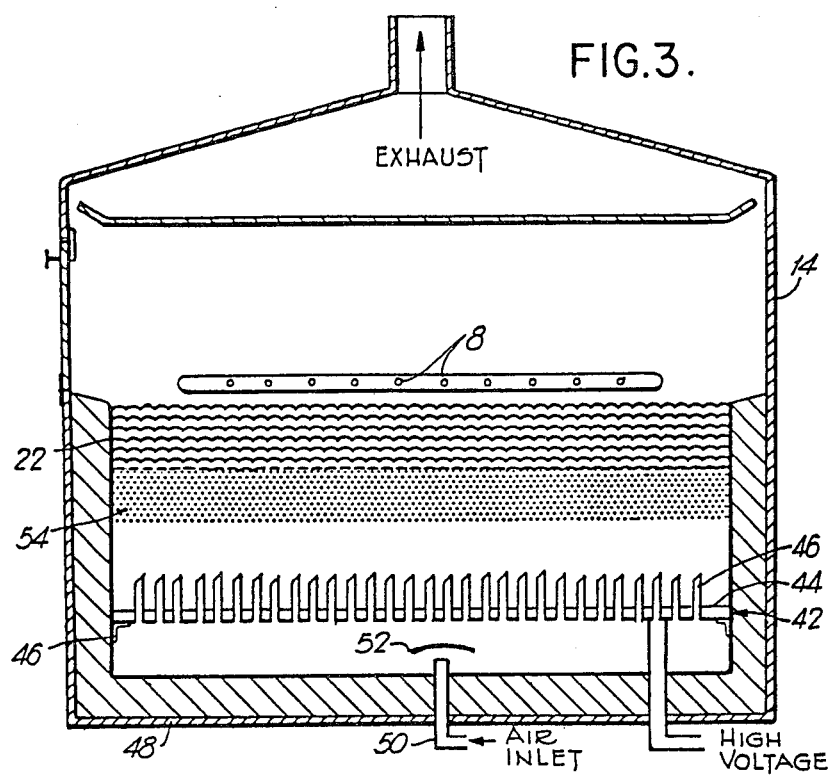
Figure 4:
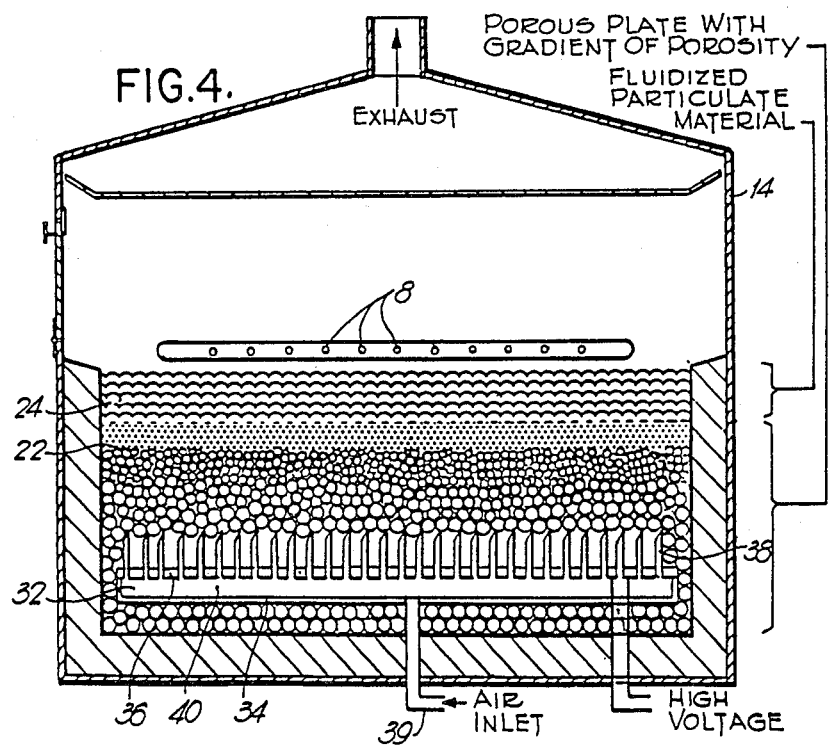

Embodiments of the invention will now be described, by way of example, with reference to the accompanying drawings in which:

FIG. 1 shows diagrammatically, the basic line process for electrostatically coating conductors;

FIG. 2 relates to a first embodiment and is a cross-sectional view through a fluidizable bed structure of an electrostatic coating apparatus viewed along the flow path of continuous articles to be coated;

FIGS. 3 and 4 are cross-sectional views similar to FIG. 2 through apparatus forming second and third embodiments; and FIG. 5 shows an alternative porous structure from that in the above embodiments.

As shown generally by FIG. 1, in an electrostatic coating apparatus for surface coating of electrical conductors for use in the telecommunications industry, a plurality of copper wires are fed from spool 10 through an electrostatic coating apparatus 12 into an oven 14 and from there to take-up reels 16. FIG. 1 shows only one of the conductors as these are in alignment in the figure.

The invention, with regard to each of the embodiments, is concerned with the fluidizable bed structure.

According to a first embodiment, as shown by FIG. 2, a fluidizable bed structure has a rectangular housing 14 having an air inlet 16 through its base 18 to a plenum defined within a metallic structure 20 located upon the base 18. Above the structure 20, and in contact with it, is disposed a rigid porous support 22 for a fluidizable bed of particulate material 24. The fluidizable material 24 is a flammable polymeric powder used for coating the electrical conductors 8. These conductors are shown in side-by-side positions in FIG. 2 as they are fed through the fluidization chamber and above the bed 24 of material.

Disposed within the support 22 is a porous plate electrode 26. This electrode is a metallic electrically conductive plate formed with holes. This may be provided by an expanded metal construction which, as is well known, is formed by providing a metal sheet with parallel, spaced and short cuts through its thickness and then stretching the metal to expand it by opening of the metal at the cuts to form a lattice. The electrode 26 is disposed a short distance above the base of the porous support 22. It is also located a predetermined distance from the upper surface 28 of the plate, this distance being calculated from the maximum voltage to which the electrode may be subjected. This distance is determined to ensure that no substantial current will pass through the interstices of the support from the electrode to the upper surface of the support. In this specification, the term "substantial current" is deemed to be one which could be harmful to an operator placing his arm inside of the housing, one which may provide arcing to the workpieces as they move over the bed, or one which is likely to cause an explosion or fire within the bed. The distance from the electrode to the surface 28 should be in the region of at least 0.6"/10 Kv of charge placed on the electrode. Thus if the electrode is to be subjected to 80 Kv, then the distance from the electrode to the surface 28 should be at least 4.8".

The support depth is such that if made by normal means, there would be a substantial pressure drop across it as the fluidized air passes through the support. This pressure drop would require substantial pressurization means forcing the air through inlet 16 to enable the air to pass through the support. To reduce this pressure drop substantially, the support, according to the invention and in this embodiment, is constructed so that the total area of the interstices taken across the support decreases from a position directly above the electrode to the upper surface 28. Ideally, this area reduces progressively upwardly through the thickness of the support. However for practical reasons it is difficult to accomplish progressive reduction in this way. This changing of the total area of the interstices is effected by making the support of a graduated size of bead material from its upper surface down to the electrode 26. These beads may be glass or ceramic beads which are fused together. The fusing may be affected by coating the beads with a polymeric material and then subjecting them to heat to cause the fusing action. Alternatively, beads may be formed from a polymeric material. In the present embodiment, the beads are formed from polymeric coated glass which changes in size from the top surface at between 15 microns to 90 microns to a position immediately above the electrode of around ⅛" diameter. The bead size beneath the electrode and down to the structure 20 is also of ⅛" diameter.

Because of the position of the electrode spaced from the support surface, the depth of the fluidizable powder in the bed may be reduced to a minimum sufficient only for coating purposes. In this particular embodiment, the expanded height of the powder material during fluidization need not exceed 1¼".

In use of the fluidizable bed of the first embodiment, high voltage of up to 80 Kv is supplied to the electrode as the electrical conductors 8 are fed above the bed of material. The workpieces are connected to ground through their spool or reel 10 whereas the electrode 26 is positively charged. Air under pressure passes into the chamber or plenum of the structure 20 through the inlet 16 and issues under pressure through apertures at the top of the structure to proceed through the interstices of the support. As the air passes through the expanded metal electrode it becomes charged positively and then proceeds upwardly through the support and out through its surface 28. Because the interstices decrease in total cross-sectional area and they also increase in number, there is a gradual pressure drop across the support which is less than the pressure drop which would be achieved if the bead size at the top of the support were used throughout. Also with this structure, there are a multitude of passages for air through the support, these passages being diversifying to diffuse the air across the full width of the support whereby a substantially uniform distribution of charged air issues from the support surface 28. The degree of uniformity is enhanced by the use of a conventional horizontally vibrating grid (not shown) carried upon the surface 28. In consequence, fluidization of the powder 24 is substantially uniform and the particles become charged more effectively than has hitherto been possible even when a vibrator means has been used in conventional apparatus. Charged particles become attracted electrostatically to the workpieces and form a layer on the electrical conductors. The conductors are then conveyed through the oven 14 to fuse the particles together to cover each of the conductors in a continuous insulating layer of polymeric material. In use of the above apparatus, if flame spread does not occur from the oven, upstream along any of the electrical conductors, it will possibly cause a fire in the fluidized bed. However, there is a negligible chance of rupture occurring in the support due to an explosion and, therefore, the air under pressure from the structure 20 will not be allowed freedom of upward movement through the bed and out through the exhaust at the top of the apparatus. Hence any fire or explosion effects are minimized. Also, because of the use of a deep support and the distribution of the interstices which enables the wide and uniform distribution of the charged air, the need for a large amount of pressurized air is reduced. Hence, as shown in FIG. 2, the support is rather deep when compared to the size of the chamber within structure 20. Thus it follows that if, in fact, there is a fire within the fluidizable bed, then there is less air under pressure within the structure 20 for passage upwardly through the bed to strengthen the fire or resultant explosion. It also follows that upon cutting off the supply of pressurized air, the pressurized air within the structure, which needs to be dissipated, is also less than with a conventional apparatus.

The above advantages are enhanced, of course, by the use of as little fluidizable powder as possible within the bed which is rendered possible by the location of the electrode beneath the support surface 28 in a position which is electrically safe for operation. Thus the amount of powder which may combust or explode is at a minimum.

Further, because the support is of rigid and strong construction, air bubble formations, air channelling, and particle elutriation within the bed are not likely to occur. Hence, any coating of material upon the electrical conductors is of substantially uniform thickness and is also substantially free of pinhole formations, because the charged particles which adhere to the conductors are fully charged and do not adhere to the conductors merely because of particle separation phenomenon.

In a second embodiment, as shown in FIG. 3, a fluidizable bed is of similar construction, basically, to that described in the first embodiment. For similar parts, the same reference numerals will be used. In the construction of the second embodiment, an electrode 32 is of different construction from that described in the first embodiment. The electrode 32 is constructed in accordance with a copending patent application Ser. No. 312,650 filed concurrently with this present application in the names of J. H. Walling, A. Dumoulin and G. Arbuthnot, and entitled "Electrode for Fluidizable Bed Coating Apparatus".

In this electrode structure, as shown in FIG. 3, the electrode comprises a structure 34 which has flat sides, top and bottom, formed from conductive metal. A top member 36 of the structure forms a base for a plurality of spaced, electrically conductive, tubes 38 which extend through the member 36 and upwardly, partly through the porous support. These tubes are soldered or otherwise secured into the member 36 to be electrically connected to it, the member being connected to electrical mains to be subjected to high voltage. As described in the copending application referred to, the tops of the tubes, i.e. their three ends, are cut at an angle.

In use, air under pressure passes through inlet 38 into the chamber 40 defined by the structure 34. The air becomes ionized as it contacts the member 36 and also as it proceeds through the tubes 38. These tubes are, in fact, the only exit for the pressurized air and thus channel the air outwardly thrugh the whole width of member 36. As the air passes through the free ends of the tubes, it is subjected to being charged in a highly efficient manner by passing through an electric field concentration which is centered around the free end of each of the tubes, the tapered tube ends adding to the concentration at this position. As covered by the copending application, with a structure of this type, sufficient charging of the air results to fluidize the bed above the support and for coating the electric conductors 8 with the use of less electric power than is necessary with a more conventional electrode construction.

In a third embodiment, as shown in FIG. 4, the electrode 42 includes a horizontal plate 44 having tubes 46 extending upwardly from it to give the same advantages as specified for the second embodiment. In this structure, however, the plate 44 does not form part of an integral structure forming a chamber. In contrast, as shown in FIG. 4, the plate 44 is fused onto the lower surface of a porous support 54 and the support and structure 42 are supported by support flanges 46 carried around the walls of the housing. Beneath the plate 44 is the plenum chamber defined between the plate and the base member 48 of the housing. Pressurized air enters through the inlet 50 and, to ensure that it is distributed across the full width of the electrode before passing through the tubes 46, it immediately hits a deflector or deflectors 52 which urge the pressurized air outwardly across the top of the base 48.

In the above embodiments, each of the supports may be easily constructed by providing a mold into which the glass beads are placed in their layers. Ideally, the support is made inverted from the position it occupies during use. To manufacture the support, the smaller sized beads are poured into the form of a layer at the bottom of a mold. The larger sized beads are then placed on top in order in their layers to form the full depth of the support. At the appropriate position, the electrode being used with the construction, is placed on top of the beads and if necessary, further beads are added, for instance as shown in the first and second embodiments. The structure is then subjected to heat to fuse the beads together and is removed from the mold for use.

Alternatively, a structure for a support may be made as shown in FIG. 5. In this structure the top and sides of the support are formed from glass plates 56 and 58. The top plate is preformed from glass beads of the smaller size, i.e. 15 to 90 microns. The side plates need not be porous. To manufacture the support, the top plate is positioned on a surface and the side plates are located together in their finished positions above the top plate, i.e. so that the structure is inverted. Beads 60 are then poured into the cavity formed by the side plates as in the previous description, i.e. they are layered according to size upwardly away from the top plate. Subsequently, heat is provided to fuse all the beads together and also to fuse them to the side and top plates.

What is claimed is:

1. A fluidized bed structure comprising a housing, a rigid porous support within the housing for carrying a bed of fluidizable powder and for supplying fluidizing gas through the support and into the powder, the support having a depth from a support surface of at least 2 inches and having its porosity formed by interstices passing through the support, the interstices reducing in total area from an input side of the support to the support surface.

2. A structure according to claim 1, wherein an electrode contacts the support and allows fluidizing gas to pass through the support.

3. A structure according to claim 2, wherein the electrode is embedded within the support.

4. A structure according to claim 1, wherein the support comprises a bead structure of a plurality of fused or adhered beads, the bead size increasing downwardly through the support.

5. A structure according to claim 4, wherein the beads increase in size in step-by-step manner.

6. A structure according to claim 1 wherein the interstices increase in number and decrease in size as they extend towards the support surface, the interstices diversifying across the support surface.

7. A fluidizable bed structure comprising:
a housing,
a rigid porous support within the housing for carrying a bed of fluidizable powder and for supply of fluidizing gas through the support and into the powder, the support defining interstices passing through it, the interstices reducing in total area from an input side of the support to the support surface; and an electrode extending across the structure, contacting material of the support and allowing fluidized gas to pass through the support, the depth of the support from its upper surface to the electrode being sufficient to prevent arcing from the electrode and through the support to its upper surface.

8. A structure according to claim 7, wherein the support comprises a bead structure of a plurality of fused or adhered beads, the bead size increasing downwardly through the support.

9. A structure according to claim 8, wherein the beads increase in size in step-by-step manner.

10. A structure according to claim 8, wherein the electrode is embedded within the support.

11. A structure according to claim 10 wherein the beads extend above and below the electrode, the beads increasing in size downwardly to the electrode.

12. A structure according to claim 10 or claim 11, wherein a plenum defining structure is disposed directly beneath the support.

13. A structure according to claim 10 or claim 11 wherein a plenum defining structure is disposed directly beneath and in contact with the support, the plenum defining structure supported by a base member of the fluidizable bed structure.

14. A structure according to claim 10, wherein the electrode is a porous plate.

15. A structure according to claim 10, wherein the electrode comprises a plate having tubes for the passage of gas extending from one plate surface, the tubes extending into the bead structure.

16. A structure according to claim 7 wherein the interstices increase in number and decrease in size as they extend towards the support surface, the interstices diversifying across the support surface.

* * * * *